(12) United States Patent
Hiskes

(10) Patent No.: US 6,685,431 B2
(45) Date of Patent: Feb. 3, 2004

(54) METHOD FOR REPAIRING A TURBINE VANE

(75) Inventor: David J. Hiskes, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 158 days.

(21) Appl. No.: 10/002,419

(22) Filed: Oct. 24, 2001

(65) Prior Publication Data
US 2003/0077171 A1 Apr. 24, 2003

(51) Int. Cl.[7] ................................................ F01D 9/04
(52) U.S. Cl. ............................... 415/209.4; 415/210.1; 29/889.1
(58) Field of Search .......................... 415/210.1, 209.4; 29/889.1, 889.22

(56) References Cited

U.S. PATENT DOCUMENTS 6,195,864 B1 * 3/2001 Chesnes .................. 29/402.01
6,416,278 B1 * 7/2002 Caddell et al. ............. 415/191

FOREIGN PATENT DOCUMENTS

GB          2 071 777          9/1981

* cited by examiner

Primary Examiner—Edward K. Look
Assistant Examiner—Kimya N McCoy
(74) Attorney, Agent, or Firm—Bachman & LaPointe, P.C.

(57) ABSTRACT

The present invention relates to a method for repairing a vane used in a gas turbine engine. The method broadly comprises the steps of providing a vane to be repaired, which vane has a first platform, a first buttress, a second platform, a second buttress, and an airfoil extending between the first and second platforms, removing the first platform, the first buttress, and the airfoil from the vane in their entirety and removing part of the second platform and the second buttress leaving a machined vane portion, providing a replacement detail having at least a replacement first platform, a replacement first buttress and a replacement airfoil, positioning the replacement detail relative to the machined vane portion, and forming a joint between the machined vane portion and the replacement detail.

18 Claims, 2 Drawing Sheets

METHOD FOR REPAIRING A TURBINE VANE

BACKGROUND OF THE INVENTION

The present invention relates to a method for repairing a vane used in a gas turbine engine.

Re-airfoiling replaces the airfoil section of a turbine vane with a new cast airfoil, while re-using the original platforms. This type of repair has been used on first stage turbine vanes in commercial jet engines. In this type of repair, the airfoil is joined to the platforms by butt welded joints within the airfoil.

In yet another repair method, a full vane repair is performed on first stage vanes. In this type of repair, the airfoil and the outer platform are entirely replaced by using a single butt weld in the airfoil.

In both of these repair methods, vane nozzle area is maintained by a re-strike of the airfoil after all joining has been completed. There remains a need for a more effective repair vane repair technique.

SUMMARY OF THE INVENTION

Accordingly, it is an object of the present invention to provide a method for repairing a vane which leaves no welds in the airfoil portion of the repaired vane.

It is a further object of the present invention to provide a method for repairing a vane which allows control of the vane nozzle area by machining of the joint surfaces instead of by an additional re-strike operation.

It is still a further object of the present invention to provide a method for repairing a vane which provides baffle to vane fit as good as on a new vane.

It is yet a further object of the present invention to provide a method for repairing a vane which requires less platform machining and which maintains the original outer platform ground surfaces, seal slots and bolt holes.

The foregoing objects are attained by the repair method of the present invention.

In accordance with the present invention, a method for repairing a vane used in a gas turbine engine is provided. The method broadly comprises the steps of providing a vane to be repaired, which vane has a first platform, a first buttress, a second platform, a second buttress, and an airfoil extending between the first and second platforms, removing the first platform, the first buttress, and the airfoil in their entirety and removing part of the second platform and the second buttress leaving a machined vane portion, providing a replacement detail having at least a replacement first platform, a replacement first buttress, and a replacement airfoil, positioning the replacement detail relative to the machined vane portion, and forming a joint between the machined vane portion and the replacement detail.

Other details of the method for repairing a vane of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
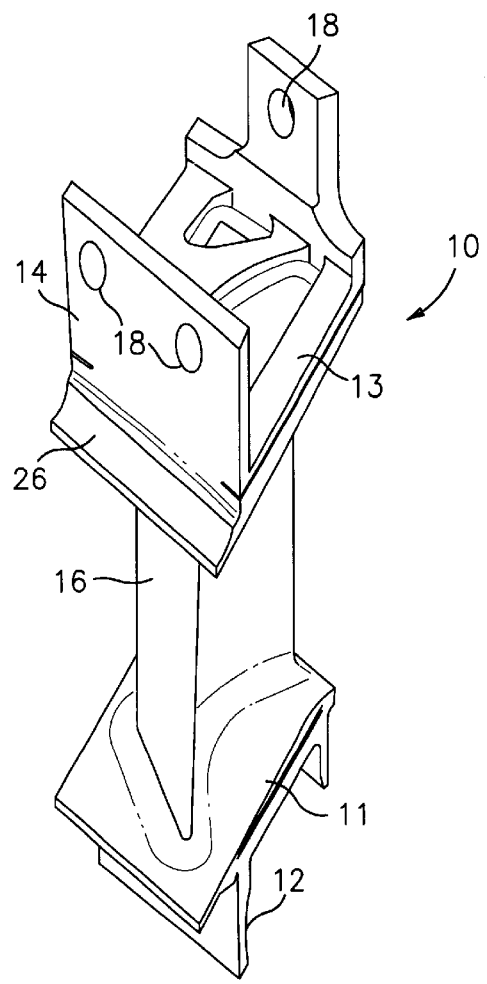
FIG. 1 is a perspective view of a vane to be repaired.

Referring now to FIG. 1, a vane 10 to be repaired is illustrated. The vane 10 has an inner platform 11, an inner buttress 12, an outer platform 13, an outer buttress 14, and an airfoil 16 extending between the inner platform 11 and the outer platform 13. The outer buttress 14 has a plurality of bolt holes 18 for joining the vane 10 to another engine component.

Figure 2:
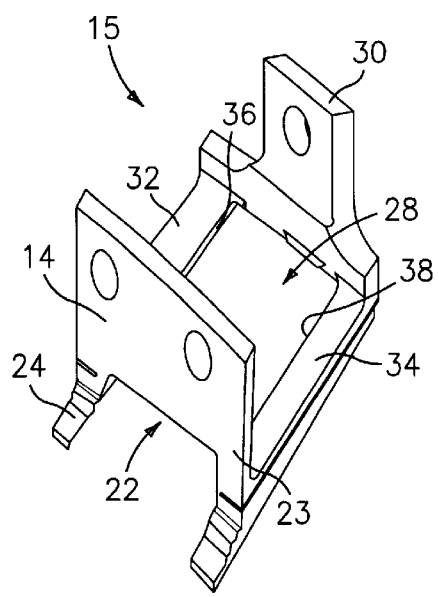
FIG. 2 is a perspective view of the vane of FIG. 1 with the inner platform, the inner buttress, the airfoil, and part of the outer platform and the outer buttress removed.
Figure 3:
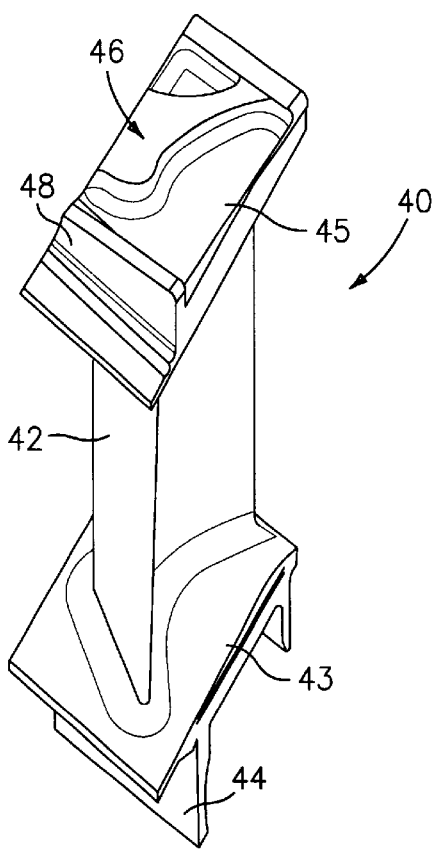
FIG. 3 is a perspective view of a replacement detail used in the method of the present invention.

FIG. 2 illustrates the portion 15 of the vane 10 remaining after the vane 10 has been machined to remove the inner platform 11, the inner buttress 12, and the airfoil 16 in their entirety and a central portion of the outer platform 13 and a portion of the outer buttress 14. The aforementioned parts of the vane 10 may be removed using any suitable technique known in the art such as grinding, milling, or wire EDM. As can be seen from FIG. 2, a notch 22 is formed in the rear buttress flange 23 of the outer buttress 14 as a result of the removal step. The notch 22 preferably extends above the surface 24 of the buttress trailing edge extension. Further, as can be seen from this figure, a central portion 28 of the outer platform 13 between the rear buttress flange 23 and the forward buttress flange 30 has been removed leaving platform side rails 32 and 34. The cuts used to remove the central portion 28 are made so that when the replacement detail 40 shown in FIG. 3 is inserted between the platform side rails 32 and 34, the airfoil portion 42 of the replacement detail 40 is properly staggered in the repaired vane 10' and the proper flow area is provided between the replacement airfoil 42 and the airfoils of adjacent vanes. Nozzle area is controlled by the angle at which the surfaces 36 and 38 of the platform side rails 32 and 34 are cut and the angle of the mating surfaces on the replacement detail 40. This enables the entire replacement airfoil 42 to be rotated to adjust the nozzle area.

FIG. 3 illustrates a replacement detail 40 which is used to repair the vane 10. The replacement detail 40 has an integrally formed replacement inner platform 43, a replacement inner buttress 44, and the replacement airfoil 42. The replacement detail 40 also has an integrally formed new central portion 46 to be seated between platform side rails 32 and 34, which central portion includes a replacement outer platform portion 45, an integrally formed raised portion 48 to be positioned in the notch 22, which raised portion 48 extends above the surface of the central portion 46, and an integrally formed replacement buttress trailing edge extension 50. The replacement detail 40 may be a cast structure having the aforementioned features. The replacement detail may be formed from the same material forming the vane 10 or a compatible material.

Figure 4:
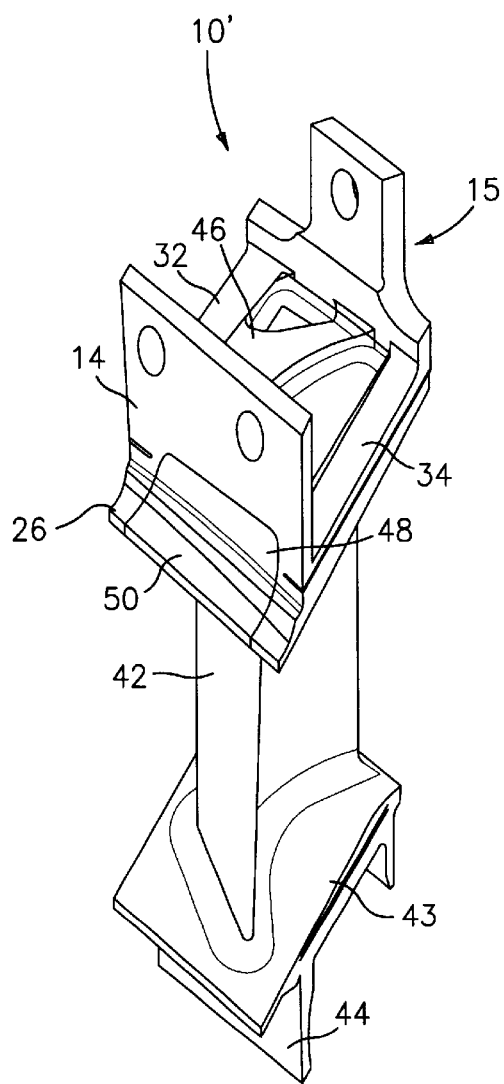
FIG. 4 is a perspective view of a vane repaired in accordance with the present invention.

FIG. 4 illustrates a repaired vane 10' after the replacement detail 40 has been positioned relative to the machined vane portion 15 and joined thereto. The replacement detail 40 and the machined vane portion 15 may be joined together using any suitable welding or brazing technique known in the art. It is preferred to use a diffusion brazing technique to join the replacement detail 40 and the machined vane portion 15. The diffusion brazing is carried out by applying a brazing material, such as a boron-containing cobalt-base brazing alloy, to the surfaces of the replacement detail 40 and the machined vane portion 15 to be joined together. After application of the brazing material, the machined vane portion 15 and the replacement detail 40 are placed in a furnace. The repaired vane 10' is then heated to a first temperature in the range of 2190° F. to 2240° F. for a time period in the range of from 1 minute to 20 minutes at a pressure in the range of 0.0005 Torr or lower. Thereafter, the repaired vane 10' is heated to a second temperature in the range of 2125° F. to 2175° F. for a time period in the range of from 1 minute to 10 minutes at an atmospheric pressure of 0.0005 Torr or lower. Thereafter, the repaired vane is cooled to a third temperature in the range of from about 2085° F. to about 2115° F., preferably at a rate of approximately 1° F./minute. The repaired vane is then held at the third temperature for a time period in the range of 8 to 12 hours. After completion of this initial cooling down period, the repaired vane 10' is allow to cool down to room temperature (approximately 68° F.).

The repair method of the present invention results in a repaired vane that has no welds in the airfoil. For either welding or diffusion brazing, the strength of material in the joint is less than the base alloy. The airfoil is exposed to the highest temperature and high strength in the airfoil providing a more durable vane. Further, since the joint is subject to lower temperatures than the airfoil, the requirements on the joint are lower.

As discussed above, the repair method of the present invention allows control of the vane nozzle area by machining of the joint surfaces instead of by an additional re-strike operation. Re-strike of the vane changes the airfoil camber to correct the nozzle area. Re-strike can be expected to induce microcracking in the areas that are deformed, particularly at the trailing edge root and tip. Re-strike also changes the airfoil shape from the optimal. For these reasons, re-strike is undesirable.

As previously discussed, nozzle area is controlled in the inventive method by the angle at which the joint surface is produced on the machined vane portion and the replacement detail. The entire airfoil is rotated to adjust area.

Airfoil cooling usually relies on maintaining a closely controlled fit between the internal baffle and inner vane wall. Mismatch at weld joints in the airfoil reduce the cooling effectiveness. The repair method of the present invention is sufficiently effective to allow a conventional internal baffle to vane fit as good as on a new vane.

The two dimensional joint configuration used in the method of the present invention allows simple machining by grinding, milling, or wire EDM. The fit at the joint can be controlled to the tolerances required for using a brazing process such as diffusion brazing.

Relative to the full vane repair method, the method of the present invention requires less platform machining while maintaining original outer platform ground surfaces, seal slots, and bolt holes. In addition, any inner platform machining can be done using outer platform machined surfaces as datums.

As a result of the repair method of the present invention, most of the airfoil loading is transmitted to the inner and outer case structures directly through the replacement detail without going through the joint, lowering the strength requirement for the joint. If a 100% joint failure occurred, no part would liberate into the engine gas path.

While the repair method has been described as removing the entire inner platform and the inner buttress and removing portions of the outer platform and the outer buttress, the method would work equally as well for similar vanes if the entire outer platform and the outer buttress and portions of the inner platform and the inner buttress are removed instead.

It is apparent that there has been provided in accordance with the present invention, a method for repairing a turbine vane which fully satisfies the objects, means and advantages set forth hereinbefore. While the present invention has been described in the context of specific embodiments thereof, other alternatives, variations, and modifications will become apparent to those skilled in the art having read the foregoing description. Therefore, it is intended to embrace those alternatives, variations, and modifications as fall within the broad scope of the appended claims.

What is claimed is:

1. A method for repairing a vane used on a turbine engine which comprises the steps of:

providing a vane to be repaired, said vane having at least a first platform, a second platform, and an airfoil extending between the first and second platforms;

removing entirely said first platform and said airfoil from said vane and removing part of said second platform leaving a machined vane portion;

providing a replacement detail having at least a replacement airfoil and a replacement first platform;

positioning said replacement detail relative to said machined vane portion;

forming a joint between surfaces of said machined vane portion and said replacement shell;

said vane being repaired further has a first buttress and a second buttress with a trailing edge extension; and said removing step comprising removing entirely said first buttress and removing a portion of said second buttress and said trailing edge extension so as to create a notch in said second buttress.

2. A method according to claim 1, wherein said second platform part removing step comprises removing a central portion of said second platform to form first and second platform side rails.

3. A method according to claim 2, wherein said replacement detail providing step comprises providing a replacement detail with a new central second platform portion, a raised portion, and a replacement buttress trailing edge extension portion and said positioning step comprises positioning said replacement detail so that said raised portion fits within said notch and said new central second platform portions fit between said platform side rails.

4. A method according to claim 1, further comprising applying a joining material to said surfaces of said machined vane portion and said replacement detail to be joined together prior to said joint forming step.

5. A method according to claim 4, wherein said joining material applying step comprises applying a brazing alloy to said surfaces.

6. A method according to claim 4, wherein said joining material applying step comprises applying a boron-containing cobalt-based brazing alloy to said surfaces.

7. A method according to claim 1, wherein said joint forming step comprises welding said replacement detail and machined vane portion surfaces.

8. A method according to claim 1, wherein said joint forming step comprises brazing said replacement detail and machined vane portion surfaces.

9. A method according to claim 1, wherein said joint forming step comprises diffusion brazing said replacement detail and machined vane portion surfaces.

10. A method for repairing a vane used on a turbine engine which comprises the steps of:

providing a vane to be repaired, said vane having at least a first platform, a second platform, and an airfoil extending between the first and second platforms;

removing entirely said first platform and said airfoil from said vane and removing part of said second platform leaving a machined vane portion;

providing a replacement detail having at least a replacement airfoil and a replacement first platform;

positioning said replacement detail relative to said machined vane portion;

forming a joint between surfaces of said machined vane portion and said replacement shell;

said joint forming step comprising diffusion brazing said replacement detail and machined vane portion surfaces; and said diffusion brazing step comprising applying a brazing material to said surfaces to be joined together prior to said joint forming step, placing said machined vane portion with said replacement detail in a furnace after said brazing material applying step, and heating said machined vane portion and said replacement detail at a first temperature in the range of 2190° F. to 2240° F. for a time period in the range of 1 minute to 20 minutes.

11. A method according to claim 10, wherein said diffusion brazing step further comprises heating said machined vane portion and said replacement detail at a second temperature in the range of 2125° F. to 2175° F. for a time period in the range of from 1 minute to 10 minutes.

12. A method according to claim 11, wherein said diffusion brazing step further comprises cooling said machined vane portion and said replacement detail from said second temperature to a third temperature in the range of from about 2085° F. to about 2115° F. and holding said third temperature for a time period in the range of 8 to 12 hours.

13. A method according to claim 12, wherein said cooling step is performed at a cooling rate of approximately 1° F. per minute.

14. A method according to claim 12, wherein said diffusion brazing step further comprises cooling said machined vane portion and said replacement detail from said third temperature to room temperature.

15. A replacement detail for use in repair of a turbine vane comprising a first platform and a portion of a second platform, a replacement airfoil extending between said first platform and said second platform portion, and a raised portion which extends above a surface of said second platform surface and a replacement buttress trailing edge extension portion.

16. A replacement detail according to claim 15, further comprising a first buttress integrally formed with said first platform.

17. A replacement detail according to claim 15, wherein said first platform, said second platform portion, and said replacement airfoil are integrally formed.

18. A replacement detail according to claim 15, wherein said replacement detail is a cast structure.

* * * * *